US012806912B2

(12) United States Patent
Ideta et al.

(10) Patent No.: US 12,806,912 B2
(45) Date of Patent: Nov. 24, 2026

(54) LIQUID EJECTION HEAD AND LIQUID EJECTION APPARATUS

(71) Applicant: CANON KABUSHIKI KAISHA, Tokyo (JP)

(72) Inventors: Satoshi Ideta, Kanagawa (JP); Kyosuke Toda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 181 days.

(21) Appl. No.: 18/742,230

(22) Filed: Jun. 13, 2024

(65) Prior Publication Data

US 2024/0416661 A1 Dec. 19, 2024

(30) Foreign Application Priority Data

Jun. 14, 2023 (JP) ................................ 2023-097926

(51) Int. Cl.
*B41J 2/175* (2006.01)
*B41J 2/18* (2006.01)

(52) U.S. Cl.
CPC ............. *B41J 2/17596* (2013.01); *B41J 2/18* (2013.01); *B41P 2251/10* (2013.01)

(58) Field of Classification Search
CPC .......... B41J 2/17596; B41J 2/18; B41J 2/175; B41P 2251/10
See application file for complete search history.

(56) References Cited

U.S. PATENT DOCUMENTS

| | | | | |
|---|---|---|---|---|
| 2009/0102879 | A1* | 4/2009 | Katada | B41J 2/17513 347/85 |
| 2019/0092034 | A1* | 3/2019 | Goto | B41J 2/175 |
| 2019/0344580 | A1* | 11/2019 | Kumagai | B41J 2/17523 |
| 2023/0120077 | A1 | 4/2023 | Miyashita et al. | |
| 2023/0191797 | A1 | 6/2023 | Takagi et al. | |
| 2023/0364919 | A1 | 11/2023 | Sato et al. | |
| 2023/0373223 | A1 | 11/2023 | Toda et al. | |

FOREIGN PATENT DOCUMENTS

| | | |
|---|---|---|
| JP | 2019-064254 A | 4/2019 |

* cited by examiner

*Primary Examiner* — Ricardo I Magallanes
*Assistant Examiner* — Tracey M Mcmillion
(74) *Attorney, Agent, or Firm* — Venable LLP

(57) ABSTRACT

A liquid ejection head and a liquid ejection apparatus are designed to be capable of reducing a decrease in productivity. To this end, a liquid sending unit is provided outside a first channel for a flow from a supply channel to a collection channel via pressure chambers and is capable of sending a liquid from a first pressure control chamber to a second pressure control chamber.

5 Claims, 13 Drawing Sheets

LIQUID EJECTION HEAD AND LIQUID EJECTION APPARATUS

BACKGROUND OF THE INVENTION

Field of the Invention

The present invention relates to a liquid ejection head and a liquid ejection apparatus.

Description of the Related Art

Japanese Patent Laid-Open No. 2019-64254 describes a method for improving the reliability of ink ejection by removing foreign substances such as air bubbles, the method including circulating an ink in a print head with differential pressure between supply pressure and collection pressure by driving a circulator pump and controlling the supply pressure and collection pressure with regulators.

In general, a cap sucking operation and a wiping operation on an ejection port surface are performed in order to recover ejection conditions in a print head. In the case of a structure of circulating an ink, the ink circulation is desired to be stopped during such cap sucking operation and wiping operation. This is because if the cap sucking operation or the wiping operation is performed while the ink is being circulated, the waste ink mixed in from the ejection ports may flow into the circulation channel and cause color mixing.

However, in the structure of generating a difference between the supply pressure and the collection pressure regulated by the regulators as described in Japanese Patent Laid-Open No. 2019-64254, it is difficult to stop the ink circulation within a short period of time. After the circulation pump is stopped, the circulation speed gradually decreases but the circulation continues until the supply pressure and the collection pressure become equal.

As described above, it may take a long period of time for ink circulation to completely stop after the circulator pump is stopped. If it takes a long period of time for ink circulation to completely stop, downtime will increase and productivity will decrease.

SUMMARY OF THE INVENTION

Therefore, the present invention has an object to provide a liquid ejection head and a liquid ejection apparatus capable of reducing a decrease in productivity.

To achieve the above, a liquid ejection head of the present invention includes:

- an ejection unit capable of ejecting a liquid;
- a first pressure control unit capable of regulating pressure in a supply channel by supplying the liquid to the liquid ejection head via the supply channel;
- a second pressure control unit capable of regulating pressure in a collection channel by collecting the liquid from the ejection unit via the collection channel;
- a first pump unit which is provided between the second pressure control unit and the first pressure control unit and which is capable of sending the liquid from the second pressure control unit to the first pressure control unit; and
- a liquid sending unit which is provided outside a first channel for a flow from the supply channel to the collection channel via the ejection unit, and which is capable of sending the liquid from the first pressure control unit to the second pressure control unit while bypassing the ejection unit.

According to the present invention, it is possible to provide a liquid ejection head and a liquid ejection apparatus capable of reducing a decrease in productivity.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

Figure 1:
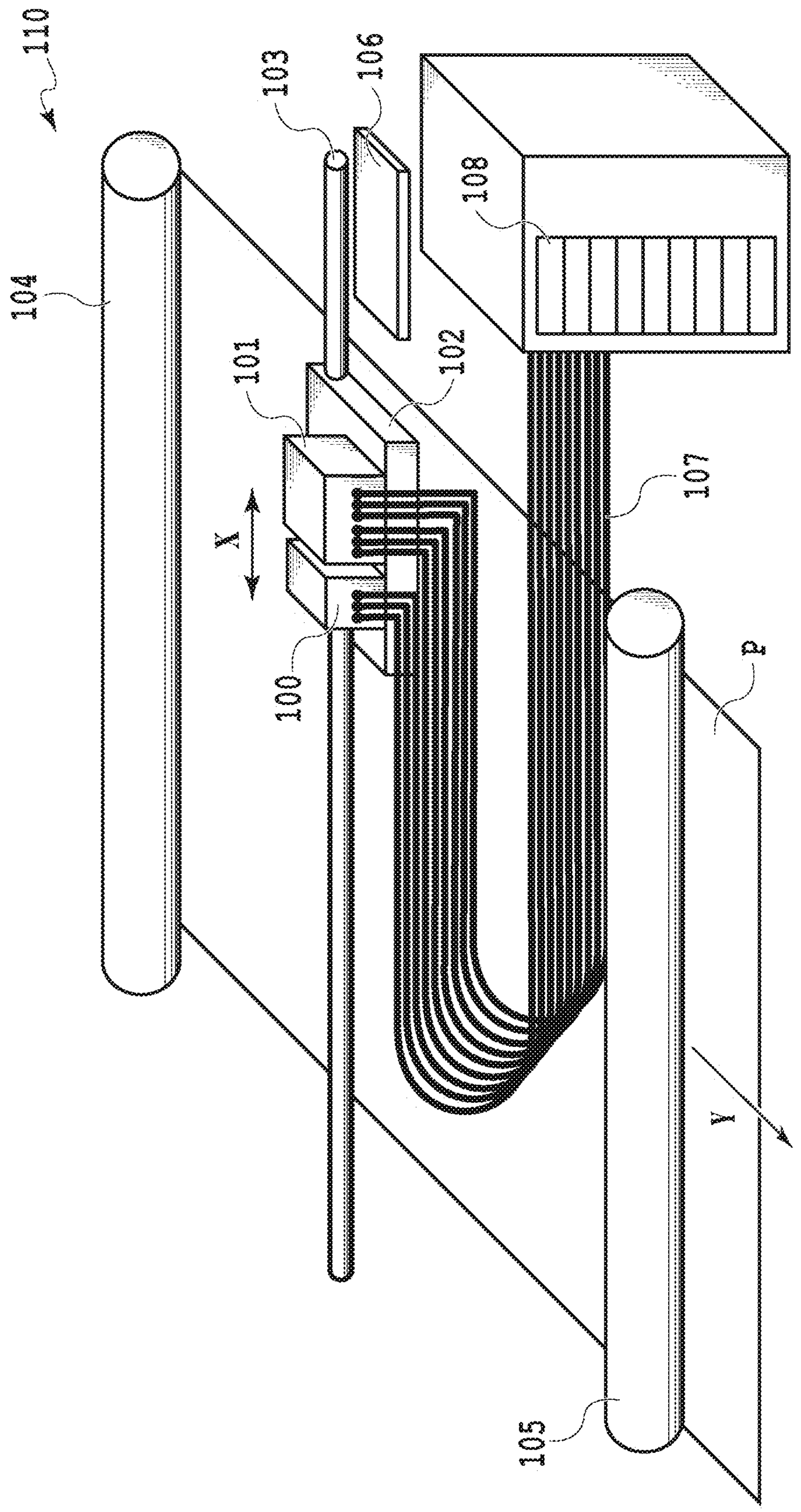
FIG. 1 is a schematic perspective view of a liquid ejection apparatus that can be equipped with a liquid ejection head.

FIG. 1 is a schematic perspective view of a liquid ejection apparatus 110 that can be equipped with a liquid ejection head to which the present embodiment is applicable. The liquid ejection apparatus 110 is a serial-scan type inkjet printing apparatus that can be equipped with liquid ejection heads 100 and 101 capable of ejecting liquids (hereinafter also referred to as inks) and that forms an image on a print medium P by ejecting the liquids from the liquid ejection heads 100 and 101. Here, the liquid ejection apparatus 110 is not limited to the serial-scan type inkjet printing apparatus but may be, for example, a line head that does not scan relative to a print medium.

The liquid ejection heads 100 and 101 are mounted on a carriage 102 and the carriage 102 moves along a guide shaft 103 in arrow X directions, that is, main-scanning directions. A print medium P is conveyed in an arrow Y direction, that is, a sub-scanning direction crossing (in the present embodiment, orthogonal to) the main-scanning directions. The liquid ejection heads 100 and 101 are supplied with inks from a main tank 108 via supply tubes 107. In each of the liquid ejection heads 100 and 101, an ink circulation unit is mounted and performs ink circulation through an ejection module to be described later. Instead, the ink circulation unit may be mounted on any place other than the liquid ejection head. A cap member 106 is arranged at a position outside a conveyance path of the print medium P. When the liquid ejection heads 100 and 101 are disengaged from print operations, the liquid ejection heads 100 and 101 move to a position where the cap member 106 can cover their ejection port surfaces, and a sucking operation for drying prevention, replenishment, and recovery for the ejection ports and a wiping operation for wiping the ejection port surfaces are performed. During a print operation, such sucking operation and wiping operation are sometimes performed with the print operation interrupted.

Figure 2:
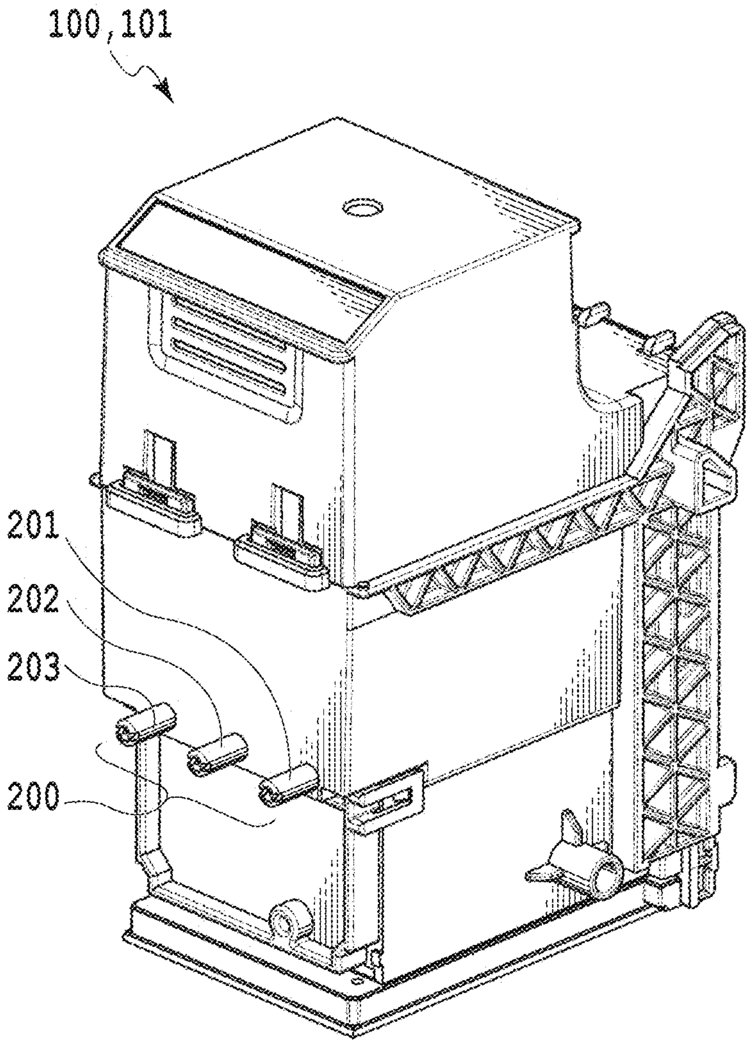
FIG. 2 is an external perspective view illustrating a liquid ejection head.
Figure 3:
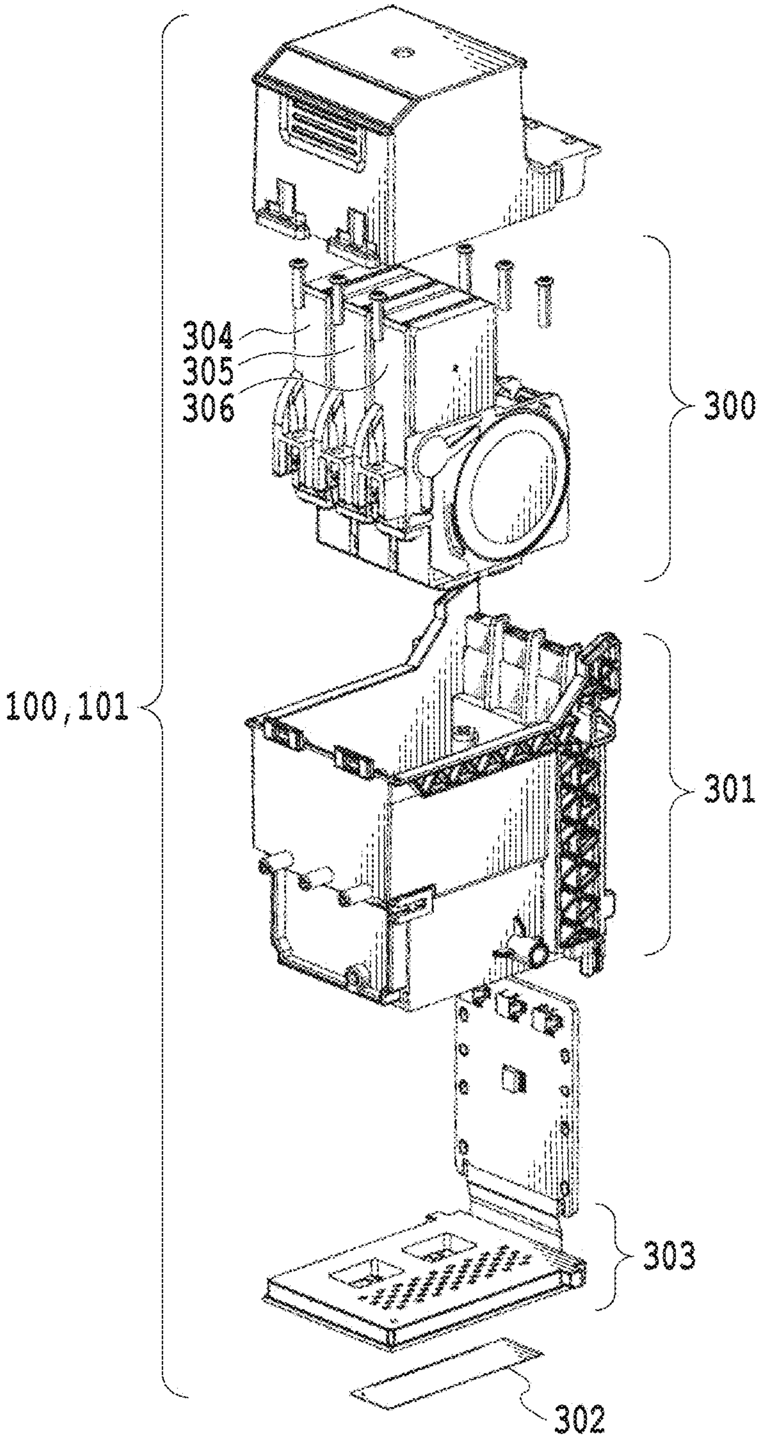
FIG. 3 is an exploded perspective view illustrating the liquid ejection head.

FIG. 2 is an external perspective view illustrating the liquid ejection head 100 or 101 and FIG. 3 is an exploded perspective view of the liquid ejection head 100 or 101. The liquid ejection head 100 or 101 includes an ink circulation unit 300. The ink circulation unit 300 includes circulation units 304, 305, and 306 corresponding to the respective inks, and the circulation units 304, 305, and 306 are connected to a casing 301. The casing 301 includes a joint unit 200 for receiving the inks from the liquid ejection apparatus 110, and the joint unit 200 includes joints 201, 202, and 203 communicating with the respective circulation units 304, 305, and 306.

In the process of attaching the liquid ejection heads 100 and 101 to the liquid ejection apparatus 110, the supply tubes 107 for the respective inks are connected to the respective joints 201, 202, and 203. The inks supplied from the supply tubes 107 are respectively supplied to the circulation units 304, 305, and 306 via the joints 201, 202, and 203 of the casing 301.

A support member 303 on which an ejection module 302 composed of an aperture plate and a print element board is mounted is connected to a bottom surface of the casing 301. The inks supplied to the ink circulation unit 300 are supplied to the support member 303 via the casing 301. The ejection module 302 and the support member 303 are bonded together with an adhesive agent. The ejection module 302 includes a silicon substrate with a thickness of 0.5 mm to 1 mm and energy generation elements provided on one of the surfaces of the silicon substrate and configured to eject the liquids.

In the present embodiment, multiple heater resistor elements (heaters) are used as the energy generation elements, and electric wiring lines for supplying power to the respective heater resistor elements are formed on the silicon substrate by a film deposition technique. In the silicon substrate, multiple pressure chambers for the respective heater resistor elements and multiple ejection ports for ejecting the inks are formed by a photolithography technique. On the back surface of the silicon substrate, a common supply channel and multiple supply ports for supplying the inks to the multiple pressure chambers and a common collection channel and multiple collection ports for collecting the inks from the pressure chambers are opened.

The liquid ejection apparatus having the aforementioned structure is often installed in a middle-sized or large-sized office. In such an environment, the liquid ejection apparatus is required to achieve high productivity. Downtime caused by interrupting a print operation during the above-mentioned sucking operation and wiping operation for cleaning the ejection port surfaces is a factor that reduces the productivity of the liquid ejection apparatus.

Hereinafter, using FIGS. 4 to 7, description will be given of a circulation operation in a circulation unit and a pressure regulation operation by pressure control units in a liquid ejection head having a conventional structure. The pressure regulation operation by the pressure control units is the same as in pressure control units in the present embodiment.

Figure 4:
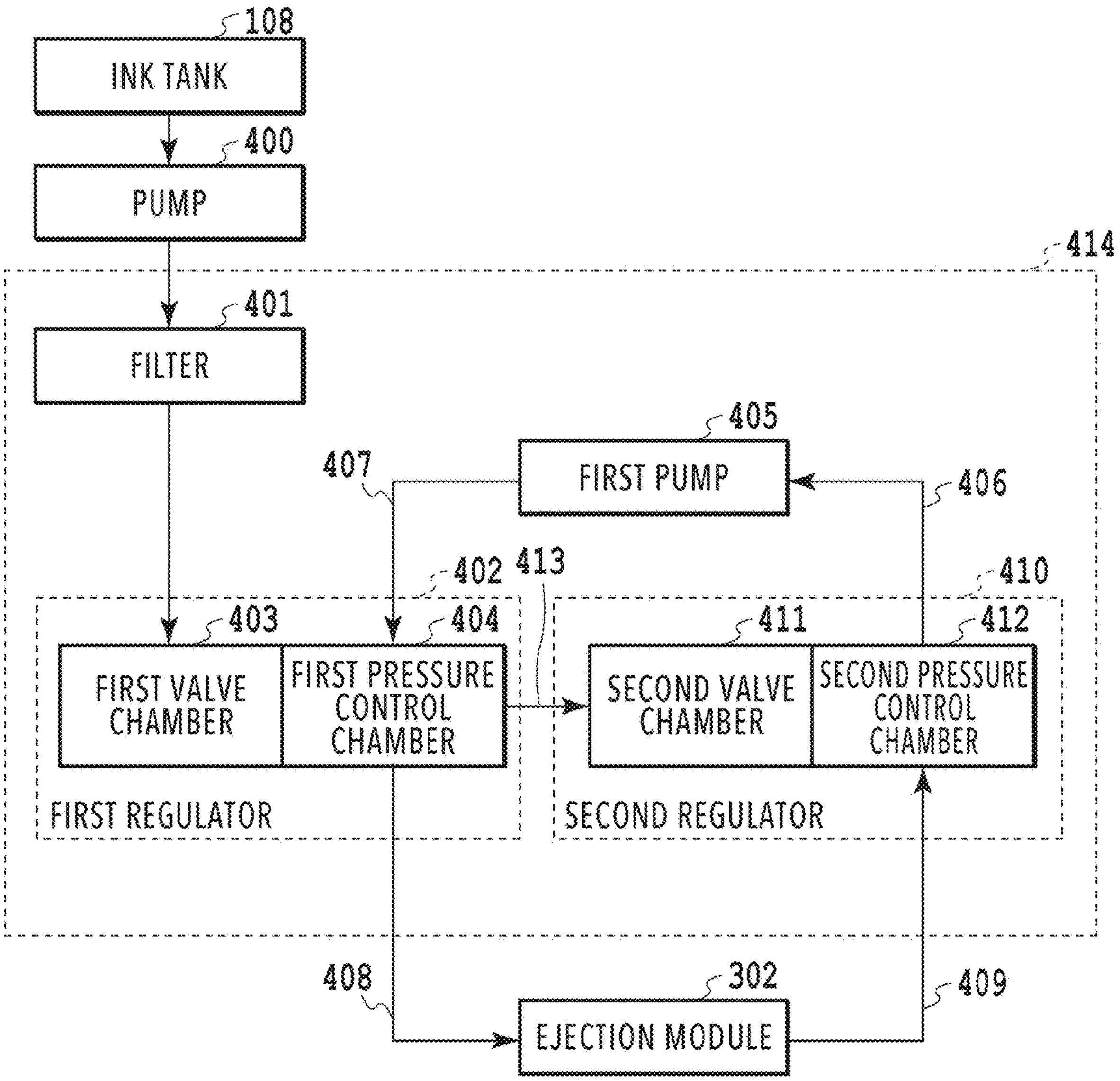
FIG. 4 is a schematic diagram illustrating a circulation unit for one color in a conventional structure.

FIG. 4 is a schematic diagram illustrating a circulation system including a circulation unit 414 for one color in the conventional structure. The ink supplied from the liquid ejection apparatus passes through a filter 401 to remove foreign particles and the like therefrom, and then is supplied to a first valve chamber 403 in a first regulator 402. A first pressure control chamber 404 is configured to be capable of regulating pressure therein. The ink supplied to the first valve chamber 403 flows into the first pressure control chamber 404 communicating with the first valve chamber 403 via a valve, so that the pressure is regulated. A first pump 405 is a piezoelectric diaphragm pump that changes the volume inside a pump chamber by inputting a drive voltage to a piezoelectric element attached to a diaphragm, and thereby pumps a liquid by alternately operating two check valves with pressure changes. The first pump 405 pumps the ink from a first pump inlet channel 406 on a downstream side to a first pump outlet channel 407 on an upstream side.

With driving of the first pump 405, the ink with pressure regulated in the first pressure control chamber 404 is supplied to a supply channel 408 and a bypass channel 413. The supply channel 408 is connected to individual supply channels of the ejection module 302 and a collection channel 409 is connected to individual collection channels of the ejection module 302. The ink supplied to the supply channel 408 flows through ejection ports from the individual supply channels and flows through the individual collection channels in the ejection module 302. Thereafter, the ink is supplied to the collection channel 409 and then is further supplied to a second pressure control chamber 412 of a second regulator 410.

The ink supplied to a second valve chamber 411 of the second regulator 410 via the bypass channel 413 is supplied to the second pressure control chamber 412 communicating with the second valve chamber 411 via a valve. The ink supplied to the second pressure control chamber 412 is supplied to the first pump inlet channel 406, passes through the first pump 405, then is supplied to the first pump outlet channel 407 after passing through the first pump 405, and thereafter is further supplied to the first pressure control chamber 404.

Such a structure in which the first pump 405 circulates the ink through the inside of the ejection module 302 as described above makes it possible to suppress thickening of the ink near the ejection ports of the ejection module 302.

Figure 5:
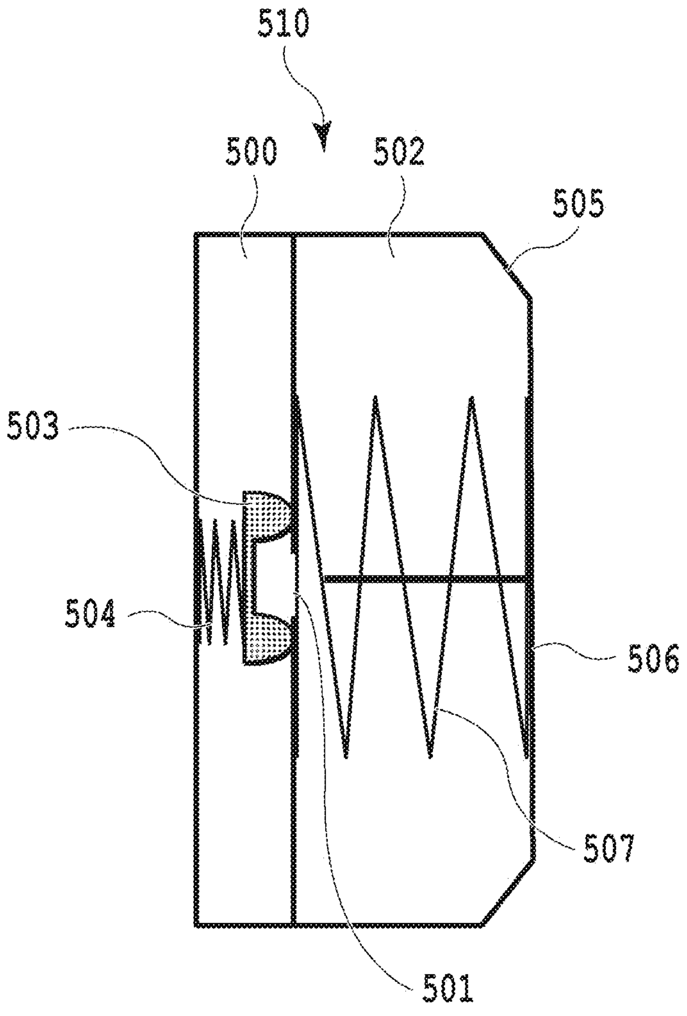
FIG. 5 is a schematic diagram illustrating a pressure control unit.

FIG. 5 is a schematic diagram illustrating a pressure control unit (regulator) 510. The pressure control unit 510 includes a first pressure control chamber 502 communicating with a first valve chamber 500 via a through hole 501. The first valve chamber 500 is provided with a valve 503 that is opened and closed to be switchable between an opened state where the first valve chamber 500 is in communication with the first pressure control chamber 502, and a closed state where the first valve chamber 500 is out of communication with the first pressure control chamber 502. The valve 503 is biased by a valve spring 504 in a direction of closing the through hole 501. For example, the valve 503 is partially formed of an elastic body, and can close the through hole 501 with the elastic body pressed against a casing side by the valve spring 504.

On the other hand, the first pressure control chamber 502 includes a flexible member 505 and a pressure plate 506 on one side thereof opened, and the pressure plate 506 is configured to be displaceable as the flexible member 505 is displaced. For example, the pressure plate 506 is formed of a resin-molded component, whereas the flexible member 505 is formed of a resin film. Then, the pressure plate 506 is joined to the flexible member 505 by thermal welding. The flexible member 505 and the pressure plate 506 are biased by a pressure regulation spring 507 in a direction of increasing the internal volume of the first pressure control chamber 502. As the pressure in the first pressure control chamber 502 decreases, the pressure plate 506 and the flexible member 505 are displaced in a direction of decreasing the internal volume. With a decrease in the pressure in the first pressure control chamber 502 to predetermined pressure, the pressure plate 506 comes into contact with the valve 503. With the pressure plate 506 coming into contact with the valve 503, the valve 503 is displaced in a direction of turning the through hole 501 into the opened state.

The pressure in the first valve chamber 500 with the valve 503 in the opened state is set to be higher than the pressure in the first pressure control chamber 502. In this case, the ink flows from the first valve chamber 500 to the first pressure control chamber 502. With the ink flowing into the first pressure control chamber 502, the flexible member 505 and the pressure plate 506 are displaced in the direction of increasing the internal volume of the first pressure control chamber 502 and the pressure in the first pressure control chamber 502 increases. With an increase in the pressure in the first pressure control chamber 502 to predetermined pressure, the valve 503 is displaced to turn the through hole 501 into the closed state, so that the ink flow from the first valve chamber 500 into the first pressure control chamber 502 is stopped.

In this way, the pressure control unit 510 is configured to keep the pressure in the first pressure control chamber 502 from decreasing below the predetermined pressure by causing the ink to flow into the first pressure control chamber 502 from the first valve chamber 500 through the through hole 501. Thus, the pressure in the first pressure control chamber 502 can be controlled within a predetermined pressure range.

Figure 6:
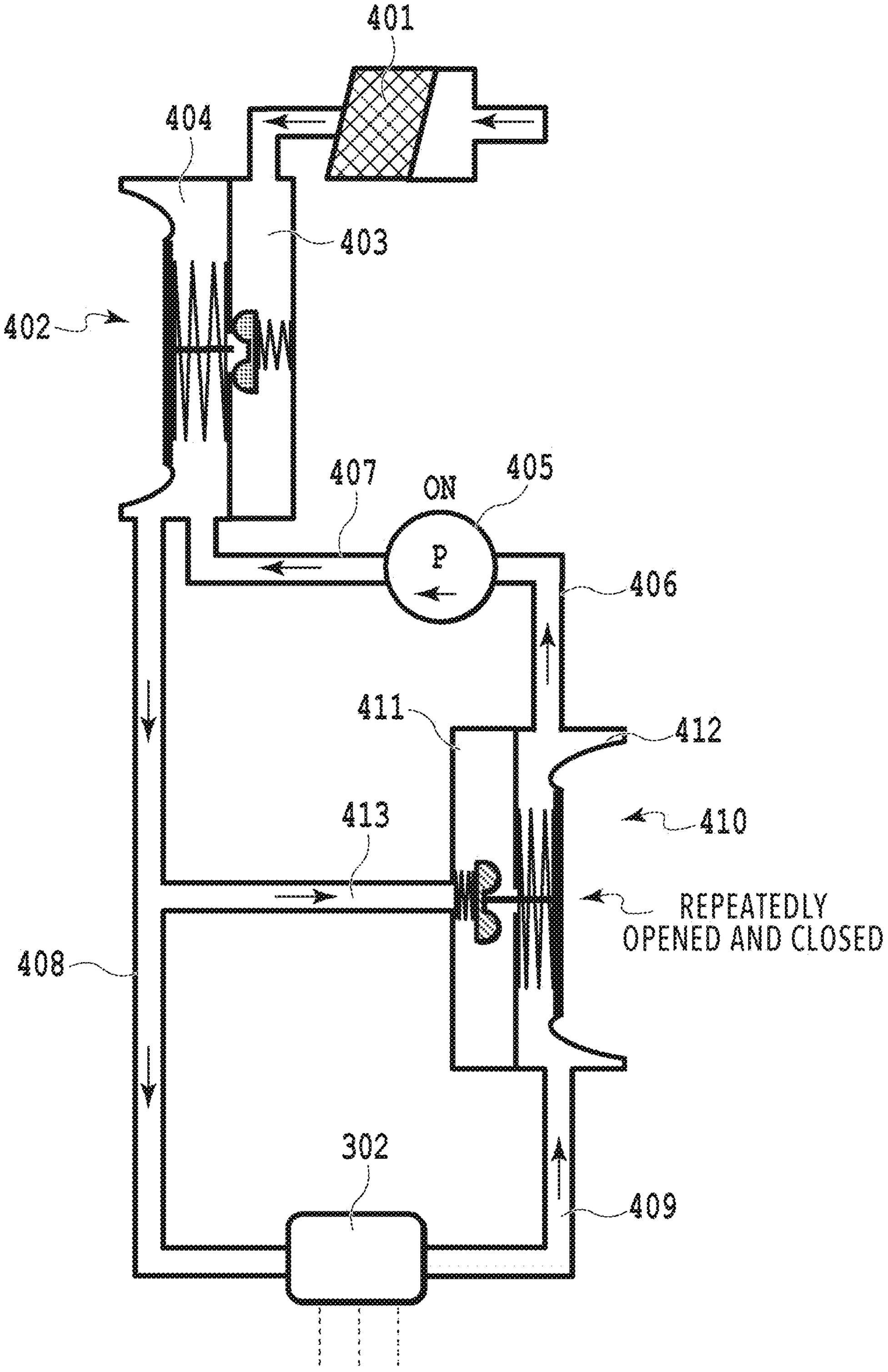
FIG. 6 is a schematic diagram illustrating flows of circulation during an ejection operation.

FIG. 6 is a diagram schematically illustrating flows of circulation during an ejection operation in a circulation channel in a conventional structure. During the ejection operation, the first pump 405 is in an ON state and the ink flowing out from the first pressure control chamber 404 is supplied to the supply channel 408 and the bypass channel 413. The ink supplied to the supply channel 408 passes through the ejection module 302, then is supplied to the collection channel 409, and thereafter is supplied to the second pressure control chamber 412.

On the other hand, the ink supplied from the first pressure control chamber 404 to the bypass channel 413 is supplied to the second pressure control chamber 412 via the second valve chamber 411. The ink supplied to the second pressure control chamber 412 is supplied to the first pressure control chamber 404 via the first pump inlet channel 406, the first pump 405, and the first pump outlet channel 407. The pressure in the first valve chamber 403 and the pressure in the first pressure control chamber 404 are determined by a spring force of a spring and a pressure receiving area of a valve inside the first regulator 402. The control pressure in the first valve chamber 403 is set to be higher than the control pressure in the first pressure control chamber 404, so that the ink is supplied from the first pressure control chamber 404 via the supply channel 408 to the ejection module 302. After that, the ink supplied to the ejection module 302 reaches the second pressure control chamber 412 via the collection channel 409. In this way, the ink is circulated through the inside of the ejection module 302.

The amount of the ink circulating in the ejection module 302 is determined by differential pressure between the control pressure in the first pressure control chamber 404 and the control pressure in the second pressure control chamber 412, and is set to such an amount that the thickening of the ink near the ejection ports in the ejection module 302 can be suppressed. Meanwhile, the ink to be consumed by ejections is supplied from the main tank 108 (see FIG. 1) to the first pressure control chamber 404 via the filter 401 and the first valve chamber 403.

Figure 7:
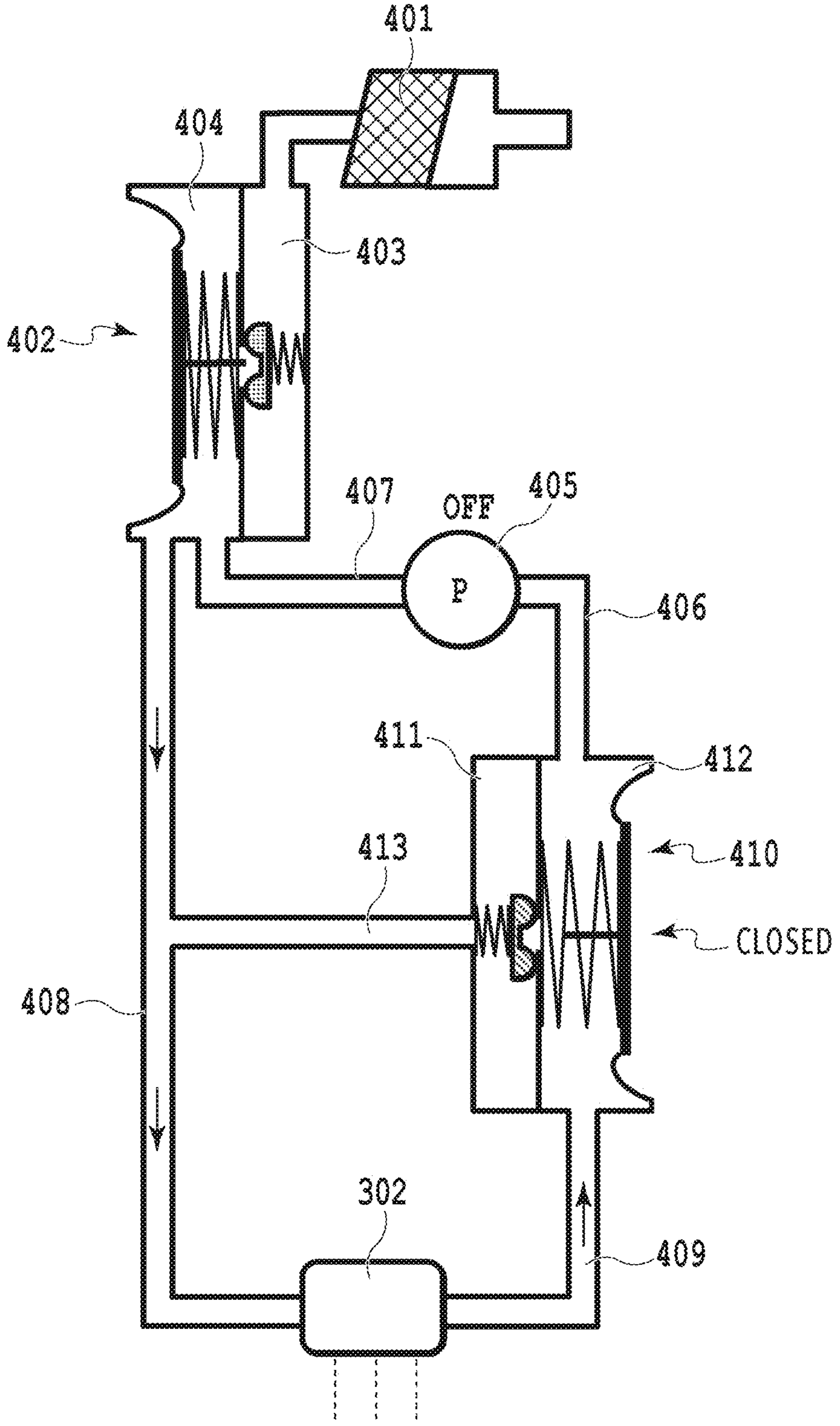
FIG. 7 is a schematic diagram illustrating flows of circulation with a first pump stopped.

FIG. 7 is a diagram schematically illustrating flows of circulation in the circulation channel in the conventional structure in a case where the first pump is stopped while the ink is circulating.

As in FIG. 7, in the conventional structure, in the case where the first pump 405 is stopped while the ink is circulating, the negative pressure in the second pressure control chamber 412 is higher than in the first pressure control chamber 404 and accordingly the ink flows from the first pressure control chamber 404 to the second pressure control chamber 412. At this time, the valve between the second pressure control chamber 412 and the second valve chamber 411 is closed, so that the ink does not flow into the bypass channel 413 but flows from the first pressure control chamber 404 to the second pressure control chamber 412 via the ejection module 302. As described above, on the back surface of the silicon substrate constituting the ejection module 302, the common supply channel and the multiple supply ports for supplying the ink to the multiple pressure chambers and the common collection channel and the multiple collection ports for collecting the ink from the pressure chambers are opened. In the ejection module 302, the ink flows through the common supply channel, the supply ports, the pressure chambers, the common collection channel, and the collection ports.

A pressure loss in the ejection module 302 is very great and the flow rate of the ink in the ejection module 302 is very low. The ink flow from the first pressure control chamber 404 to the second pressure control chamber 412 continues until the inner pressure in the first pressure control chamber 404 and the inner pressure in the second pressure control chamber 412 become equal, and the ink flow in the ejection module 302 also continues during that period.

In the liquid ejection apparatus, the sucking operation and the wiping operation are periodically performed in order to clean the ejection ports and the ejection port surfaces of the ejection module 302 and thereby recover the ejection conditions. In these operations, the sucking is performed on the ejection ports for multiple colors collectively, and therefore another color ink may flow in from the ejection ports during wiping and cause color mixing in the ejection module. In this case, an additional sucking operation is performed to suck out and discard the color-mixed ink in the ejection module, thereby preventing the color mixing from affecting subsequent ejections.

If there is an ink flow in the ejection module 302 during the above operations, the other color ink mixed in the ejection module is joined to the ink flow and diffused from the ejection module 302 to the second regulator 410, the first pump 405, and the first regulator 402. In this case, it is impossible to eliminate the color mixing in the circulation channel, which causes a problem such as a change in color tone on a printed product. To prevent this, it is necessary to completely stop the ink flow in the ejection module in advance, and then perform the sucking operation and the wiping operation under that condition.

Since the ink flow continues for a while even after the first pump 405 is stopped as described above, the liquid ejection apparatus has to be stopped for several tens of seconds to several minutes until the inner pressure in the first pressure control chamber 404 and the inner pressure in the second pressure control chamber 412 become equal. The wait time for several tens of seconds to several minutes that periodically occurs as described above is quite long downtime, and decreases the work efficiency.

To address this, the present embodiment employs a structure including a second pump 800 that is arranged in parallel with the first pump 405 and that pumps the ink in a direction reverse to that of the first pump 405.

Figure 8:
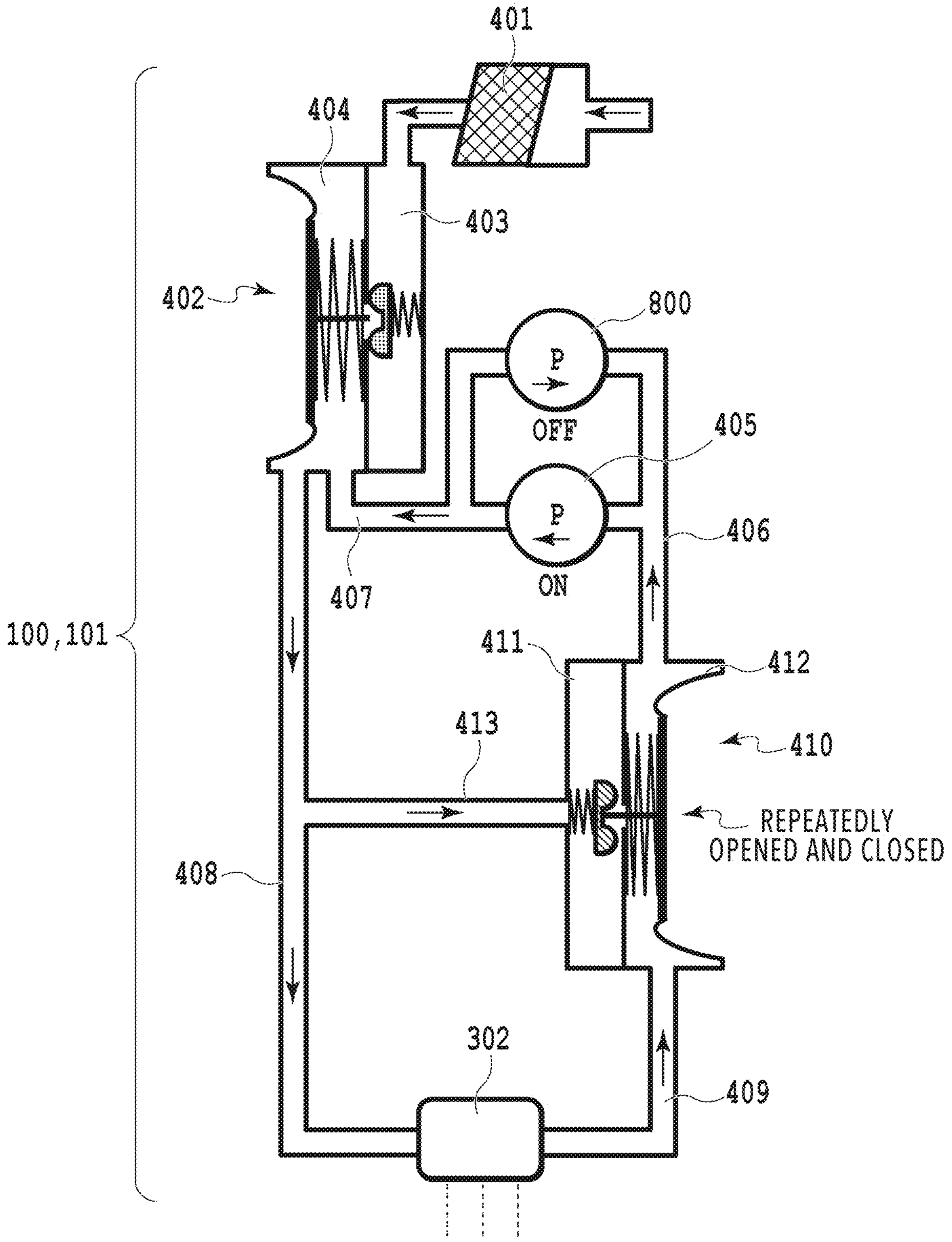
FIG. 8 is a schematic diagram illustrating flows of circulation in the circulation unit.
Figure 9:
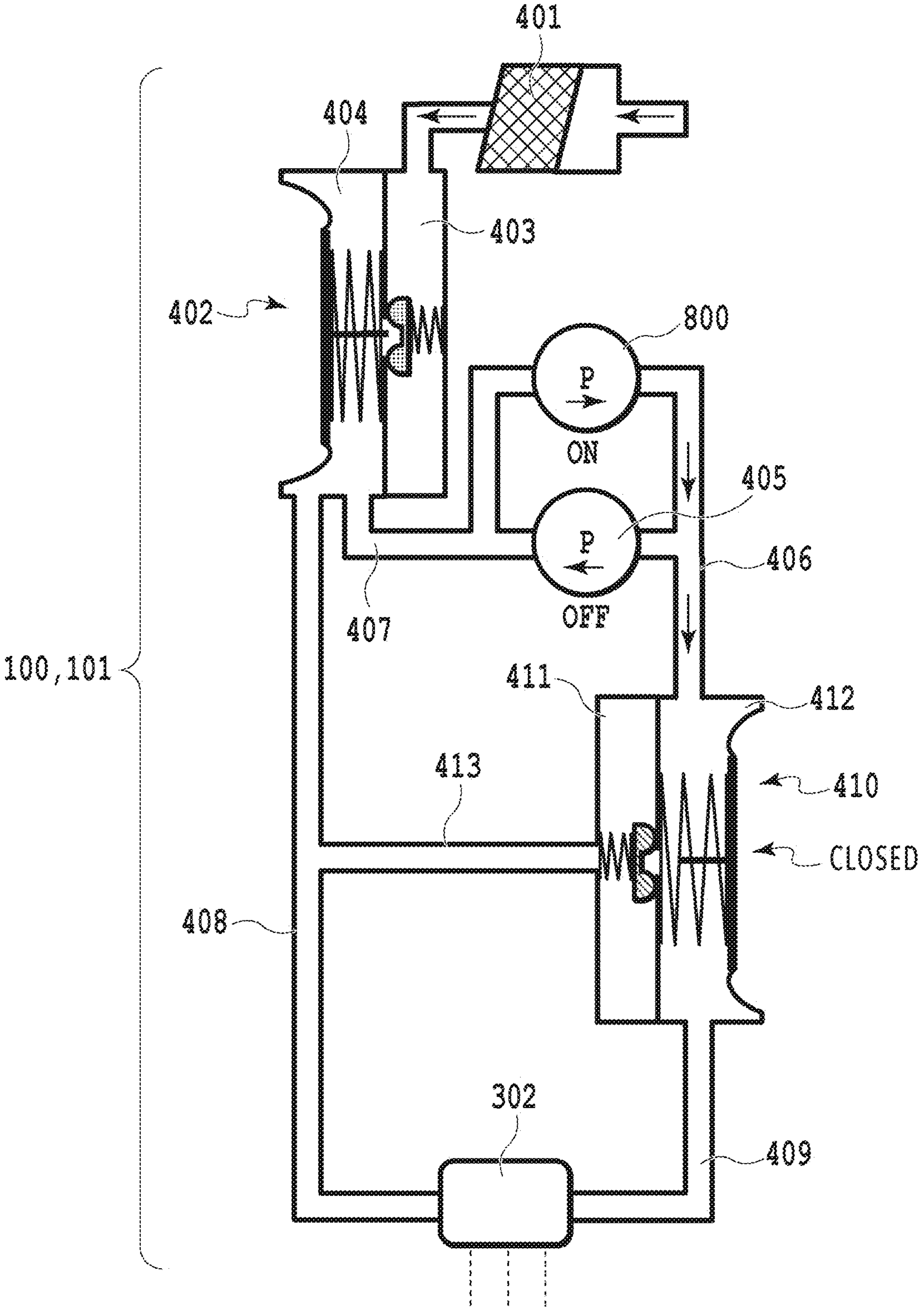
FIG. 9 is a schematic diagram illustrating flows of circulation in the circulation unit.

FIGS. 8 and 9 are diagrams schematically illustrating flows of circulations in the liquid ejection head 100 or 101 in the present embodiment. Here, the same members as in the conventional structure will be described by using the same reference signs.

For ink circulation with ink ejections, the second pump 800 is stopped (OFF) and the first pump 405 is driven (ON) to circulate the ink. In this case, the ink circulation path is the same as in the case of FIG. 6. The amount of the ink circulating in the ejection module 302 is determined by the differential pressure between the control pressure in the first pressure control chamber 404 and the control pressure in the second pressure control chamber 412, and is set to such an amount that the thickening of the ink near the ejection ports can be suppressed. As the second pump 800, a piezoelectric diaphragm pump or the like is used as in the case of the first pump 405.

In the case of stopping the ink circulation, as illustrated in FIG. 9, the first pump 405 is stopped (OFF) and thereafter the second pump 800 is driven (ON). As a result, the ink flows into the second regulator 410 from the second pump 800, the negative pressure in the second pressure control chamber 412 decreases and becomes equal to the negative pressure in the first pressure control chamber 404, so that the differential pressure between the first pressure control chamber 404 and the second pressure control chamber 412 is eliminated.

A driving time of the second pump 800 is set in advance so that the pump will stop under the condition where a forward flow becomes almost zero. The driving of the second pump 800 is stopped at latest before a reverse flow occurs. After that, the recovery operations such as the cap sucking operation and the wiping operation on the ejection port surfaces are performed.

In the ink flow sent by the second pump 800 from the first pressure control chamber 404 to the second pressure control chamber 412 (second channel), a larger amount of the ink can be caused to flow within a short period of time than in the flow from the first pressure control chamber 404 to the second pressure control chamber 412 via the ejection module 302 (first channel). Thus, the use of the second pump 800 makes it possible to reduce the downtime because a time required to eliminate the differential pressure between the first pressure control chamber 404 and the second pressure control chamber 412 is shorter than in the conventional structure.

Since the differential pressure between the first pressure control chamber 404 and the second pressure control chamber 412 is eliminated as described above, no ink flow due to the differential pressure will occur in the ejection module 302 and no color mixing will occur even if the cap sucking operation and the wiping operation are performed. According to the present embodiment, the second pump 800 is driven and the differential pressure between the first pressure control chamber 404 and the second pressure control chamber 412 is eliminated actively. This structure can reduce the downtime required to eliminate the differential pressure between the first pressure control chamber 404 and the second pressure control chamber 412 and suppress a decrease in the productivity.

Figure 10:
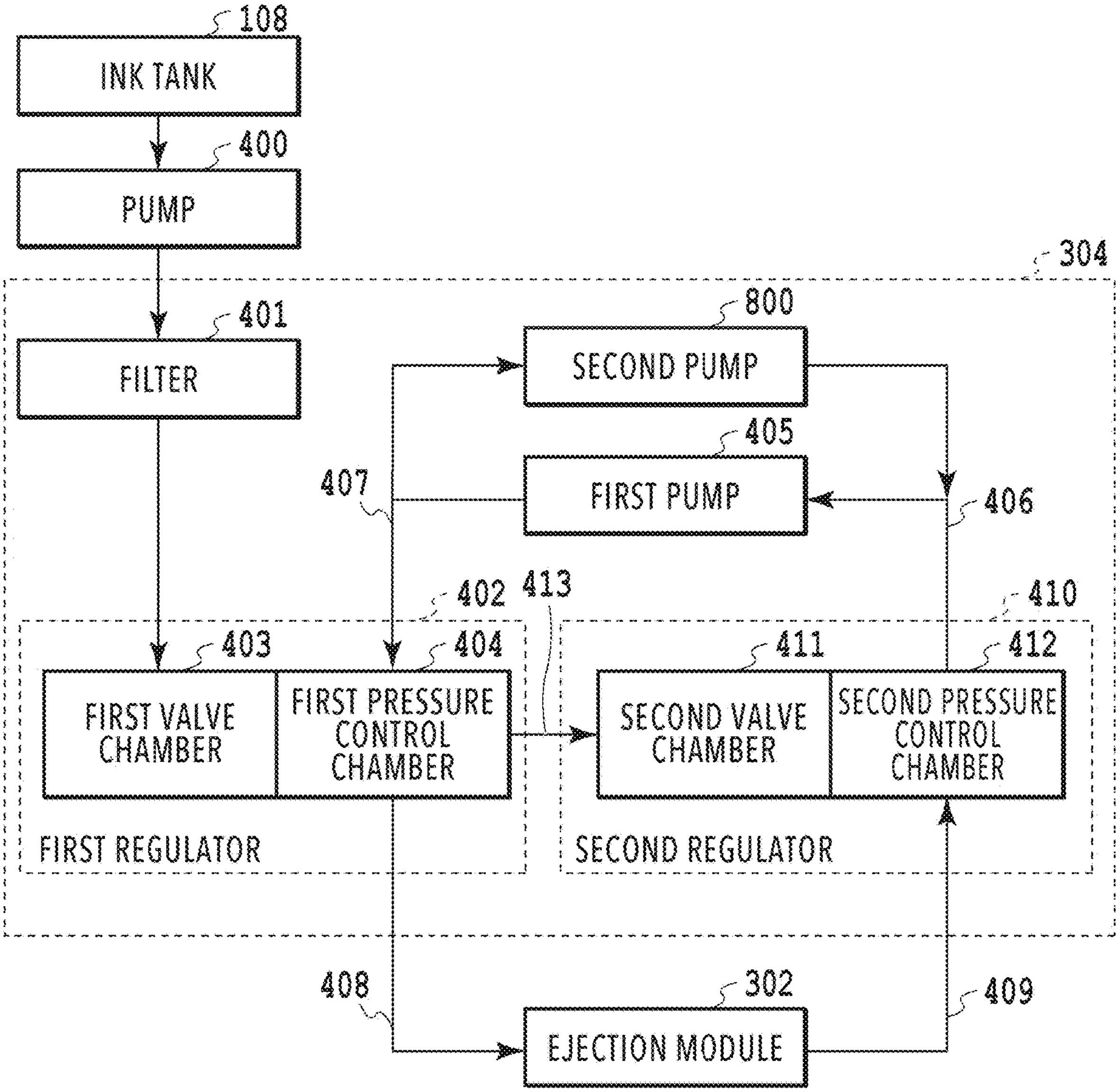
FIG. 10 is a schematic diagram illustrating a circulation unit for one color.

FIG. 10 is a schematic diagram illustrating a circulation system including the circulation unit 304 for one color in the present embodiment. Here, the same members as those in the conventional structure are denoted by the same reference signs. Although the circulation unit 304 is described as an example in FIG. 10, the circulation units 305 and 306 have the same structure. The circulation unit in the present embodiment includes the second pump 800 that is arranged in parallel with the first pump 405 and that pumps the ink in the direction reverse to that of the first pump 405.

Although the present embodiment is described for the structure in which the liquid ejection head includes the first pressure control chamber, the second pressure control chamber, the first pump, and the second pump, the structure is not limited to this. In another possible structure, the first pressure control chamber, the second pressure control chamber, the first pump, and the second pump are provided separately from the liquid ejection head.

Thus, a liquid sending unit is provided outside the first channel for the flow from the supply channel 408 to the collection channel 409 via the pressure chambers in the ejection module 302, and can send the liquid from the first pressure control chamber 404 to the second pressure control chamber 412. With this, it is possible to provide a liquid ejection head and a liquid ejection apparatus capable of reducing a decrease in productivity.

(Modifications)

Hereinafter, modifications of the above embodiment will be described.

Figure 11:
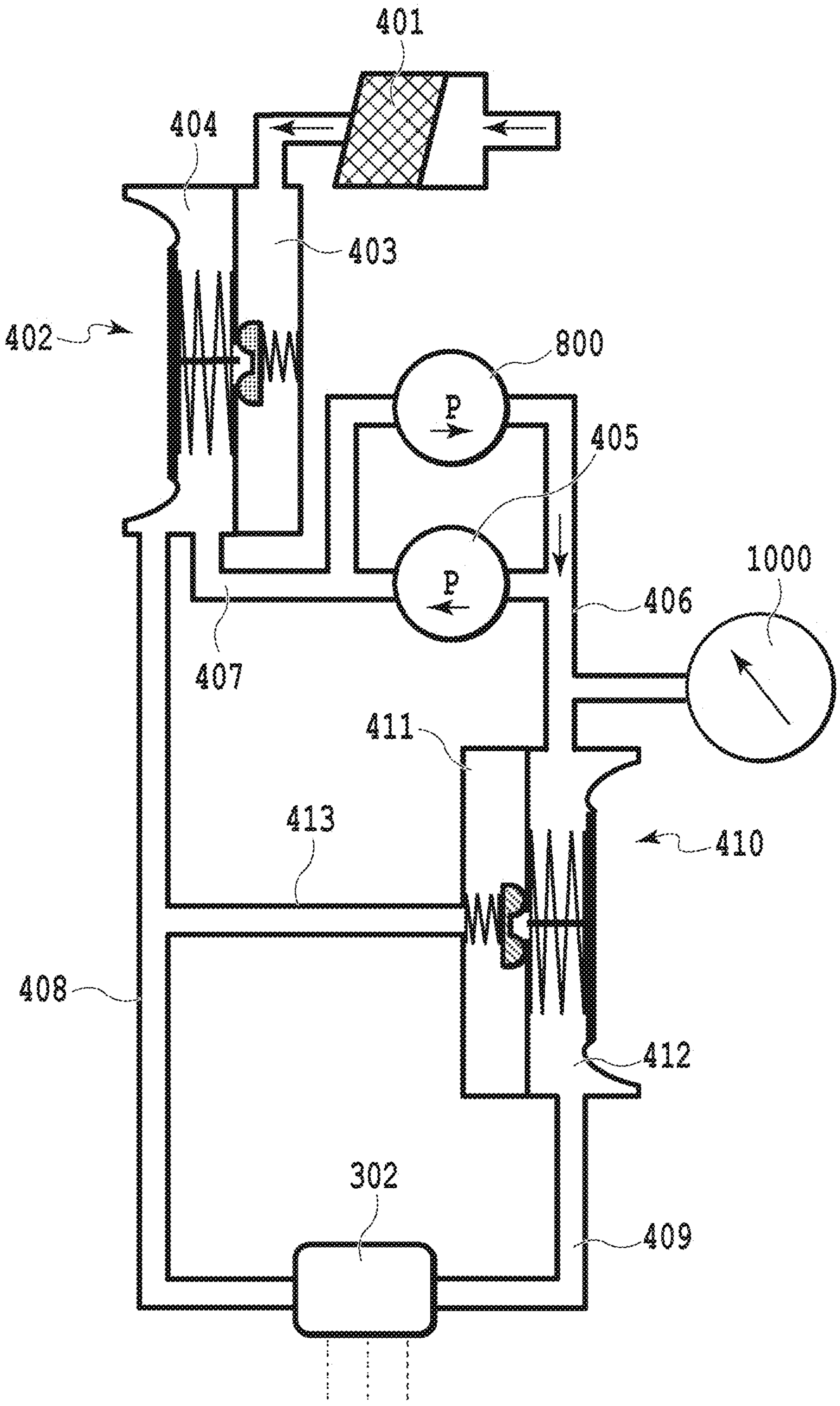
FIG. 11 is a schematic diagram illustrating flows of circulation in the circulation unit.

FIG. 11 is a diagram schematically illustrating flows of circulation in a circulation unit in a modification of the present embodiment. If the ink excessively flows into the second regulator 410 by driving the second pump 800, the pressure in the second regulator 410 may become positive in some cases. In this case, in order to eliminate the positive pressure in the second regulator 410, the ink may leak out from the ejection module 302 and contaminate the inside of the liquid ejection apparatus. In order to prevent the pressure in the second regulator 410 from becoming positive, a pressure gauge 1000 capable of measuring the pressure in the second regulator 410 is installed between the second pump 800 and the second regulator 410, and monitors the pressure in the second regulator 410. With this, the second pump 800 can be controlled so as to prevent the pressure in the second regulator 410 from becoming positive.

Second Embodiment

Hereinafter, a second embodiment of the present invention will be described with reference to the drawing. Since the basic structure of the present embodiment is the same as that of the first embodiment, a characteristic structure will be described below.

Figure 12:
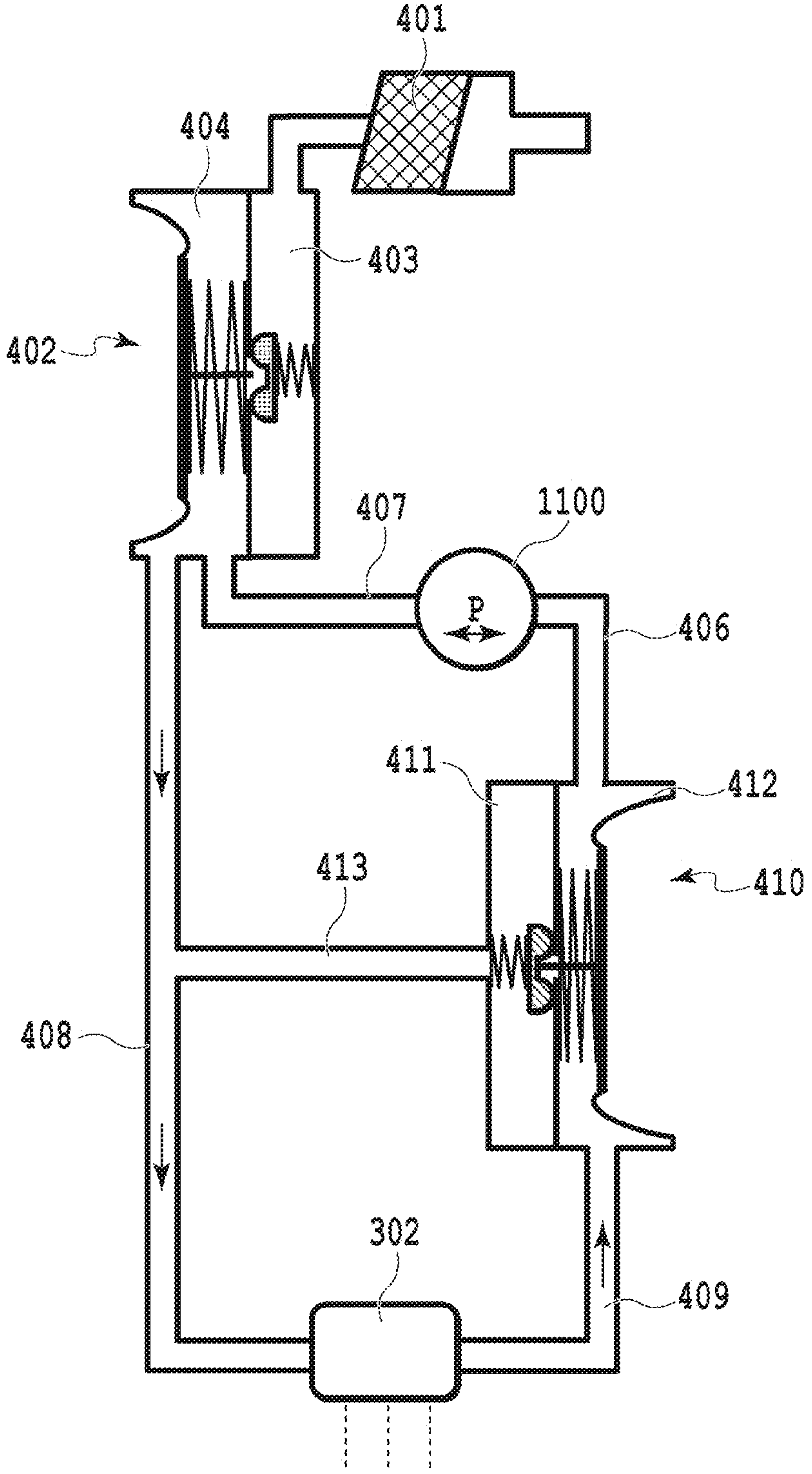
FIG. 12 is a schematic diagram illustrating flows of circulation in the circulation unit.

FIG. 12 is a diagram schematically illustrating flows of circulation in a circulation unit in the present embodiment. In the foregoing embodiment, the second pump 800 that is arranged in parallel with the first pump 405 and that pumps the ink in the direction reverse to that of the first pump 405 is added as the method for cancelling out the negative pressure in the second regulator 410.

Instead of providing the second pump 800, the first pump 405 may be configured as a bidirectional pump (such as a tube pump) 1100. In the case of stopping the circulation, the bidirectional pump 1100 is rotated in the reverse direction to cancel out the negative pressure.

Third Embodiment

Hereinafter, a third embodiment of the present invention will be described with reference to the drawing. Since the basic structure of the present embodiment is the same as that of the first embodiment, a characteristic structure will be described below.

Figure 13:
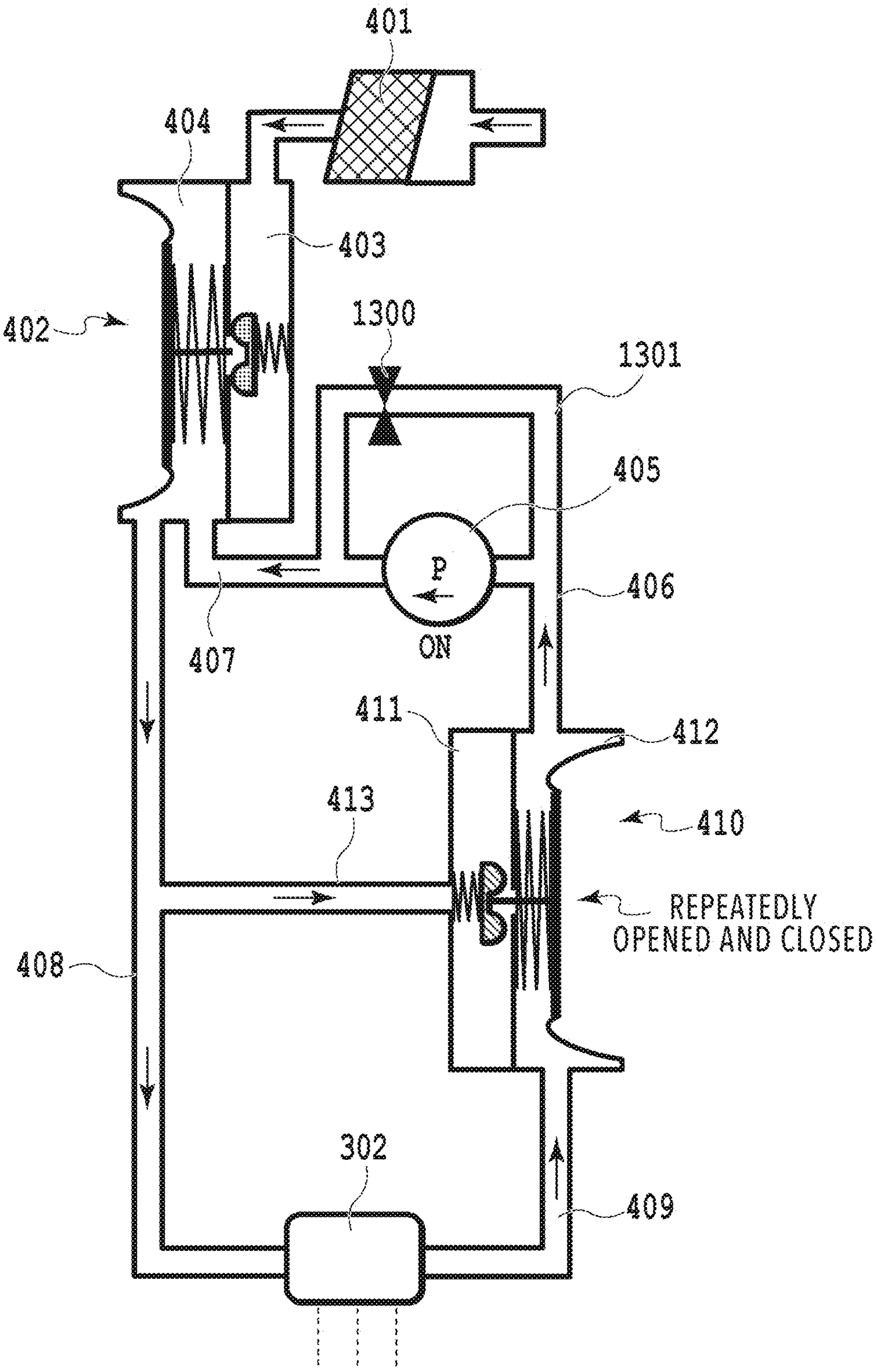
FIG. 13 is a schematic diagram illustrating flows of circulation in the circulation unit.

FIG. 13 is a diagram schematically illustrating flows of circulation in a circulation unit in the present embodiment. In the present modification, a valve 1300 is included in place of the second pump 800 in the foregoing embodiment. A negative pressure relief channel 1301 is provided between the first pressure control chamber 404 and the second pressure control chamber 412. In the case where the valve 1300 is opened, the negative pressure relief channel 1301 allows the ink to flow with the flow resistance lower than the flow resistance in the supply channel 408 and the collection channel 409 via the ejection module 302. For ink circulation with ink ejections, the valve 1300 is closed. In the case of stopping the ink circulation, the first pump 405 is stopped and then the valve 1300 is opened, so that the differential pressure between the first pressure control chamber 404 and the second pressure control chamber 412 is eliminated. The differential pressure between the first pressure control chamber 404 and the second pressure control chamber 412 may be eliminated with this structure.

Note that the flow resistance in the negative pressure relief channel 1301 may be equal to the flow resistance in the supply channel 408 and the collection channel 409 via the ejection module 302. As long as the ink can be supplied from the first pressure control chamber 404 to the second pressure control chamber 412 via the negative pressure relief channel 1301, the effect of the present invention can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-097926 filed Jun. 14, 2023, which is hereby incorporated by reference herein in its entirety.

What is claimed is:

1. A liquid ejection head comprising:

an ejection unit capable of ejecting a liquid;

a first pressure control unit capable of regulating pressure in a supply channel by supplying the liquid to the ejection unit via the supply channel;

a second pressure control unit capable of regulating pressure in a collection channel by collecting the liquid from the ejection unit via the collection channel;

a pump unit which is provided between the second pressure control unit and the first pressure control unit and which is capable of sending the liquid from the second pressure control unit to the first pressure control unit; and a liquid sending unit which is provided outside a first channel for a flow from the supply channel to the collection channel via the ejection unit, and which is capable of sending the liquid from the first pressure control unit to the second pressure control unit while bypassing the ejection unit, wherein the liquid sending unit is a second channel which connects the first pressure control unit and the second pressure control unit and which is provided in parallel with the pump unit, and wherein the second channel has flow resistance lower than flow resistance of the first channel.

2. The liquid ejection head according to claim 1, wherein the second channel includes a valve capable of opening and closing the second channel.

3. The liquid ejection head according to claim 1, wherein the ejection unit ejects the liquid by driving a heater resistor element.

4. A liquid ejection apparatus comprising:

a liquid ejection head capable of ejecting a liquid;

a first pressure control unit capable of regulating pressure in a supply channel by supplying the liquid to the liquid ejection head via the supply channel;

a second pressure control unit capable of regulating pressure in a collection channel by collecting the liquid from the liquid ejection head via the collection channel;

a pump unit which is provided between the second pressure control unit and the first pressure control unit and which is capable of sending the liquid from the second pressure control unit to the first pressure control unit; and a liquid sending unit which is provided outside a first channel for a flow from the supply channel to the collection channel via the liquid ejection head, and which is capable of sending the liquid from the first pressure control unit to the second pressure control unit while bypassing the liquid ejection head, wherein the liquid sending unit is a second channel which connects the first pressure control unit and the second pressure control unit and which is provided in parallel with the pump unit, and wherein the second channel has flow resistance lower than flow resistance of the first channel.

5. A liquid ejection apparatus comprising:

an ejection unit capable of ejecting a liquid;

a first pressure control unit capable of regulating pressure in a supply channel by supplying the liquid to the ejection unit via the supply channel;

a second pressure control unit capable of regulating pressure in a collection channel by collecting the liquid from the ejection unit via the collection channel;

a pump unit which is provided between the second pressure control unit and the first pressure control unit and which is capable of sending the liquid from the second pressure control unit to the first pressure control unit; and a liquid sending unit which is provided outside a first channel for a flow from the supply channel to the collection channel via the ejection unit, and which is capable of sending the liquid from the first pressure control unit to the second pressure control unit while bypassing the ejection unit, wherein the liquid sending unit is a second channel which connects the first pressure control unit and the second pressure control unit and which is provided in parallel with the pump unit, and wherein the second channel has flow resistance lower than flow resistance of the first channel.

* * * * *